United States Patent
Toyofuku

(10) Patent No.: US 7,218,408 B2
(45) Date of Patent: May 15, 2007

(54) IMAGE PRINTING SYSTEM

(75) Inventor: Takashi Toyofuku, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 954 days.

(21) Appl. No.: 10/099,999

(22) Filed: Mar. 19, 2002

(65) Prior Publication Data
US 2002/0135804 A1   Sep. 26, 2002

(30) Foreign Application Priority Data
Mar. 21, 2001   (JP) ............................ 2001-080598

(51) Int. Cl.
G06F 3/12   (2006.01)
G06K 1/00   (2006.01)
(52) U.S. Cl. ...................................... 358/1.15; 358/1.9
(58) Field of Classification Search ............... 358/1.15, 358/524, 426.02, 426.01, 426.05, 1.16, 1.13, 358/1.14, 1.17, 523, 403, 405, 437, 449
See application file for complete search history.

(56) References Cited

U.S. PATENT DOCUMENTS

| | | | | |
|---|---|---|---|---|
| 5,844,694 A | * | 12/1998 | Miura | 358/468 |
| 5,918,088 A | * | 6/1999 | Rikima | 399/82 |
| 6,047,111 A | * | 4/2000 | Sugiura et al. | 358/1.15 |
| 6,567,120 B1 | * | 5/2003 | Hamamura et al. | 348/207.99 |
| 2005/0225790 A1 | * | 10/2005 | Hayasaki | 358/1.13 |

* cited by examiner

Primary Examiner—Douglas Q. Tran
(74) Attorney, Agent, or Firm—Sughrue Mion, PLLC

(57) ABSTRACT

The present invention provides an image recording device, an image recording system and an image recording method which can improve a productivity by receiving image information simultaneously when the image information to be image recorded is sent from a plurality of host computers, even if a host computer having a slow rate of transmission for the image information is disposed. A buffer is provided in the image recording device and the image information sent simultaneously from the image information supplying devices is stored independently in the buffer. Thus, the time required for transferring the image information can be reduced such that the productivity can be improved.

19 Claims, 6 Drawing Sheets

IMAGE PRINTING SYSTEM

BACKGROUND OF THE INVENTION

1. Field of the Invention

The present invention relates to an image recording device, which includes a buffer that accumulates image information independently and simultaneously when the image information is transmitted from a plurality of image information supplying devices during a same period of time, an image recording system and an image recording method.

2. Description of the Related Art

Conventionally, for a printer in a multi-host environment in which a plurality of host computers are provided on the same network, when the printer receives print commands from the host computers, the printer performs image recording in the order of receiving the print commands.

However, the aforementioned printer cannot receive the print commands simultaneously. After a reception of data received first is completed, the printer starts receiving the next data. Accordingly, there is a problem in that it takes time to complete the reception of the next data.

In particular, when a conversion of original data into image data is performed in the host computers and the resulting image data is sent to the printer after the conversion, the conversion starts once the printer has returned to signal-receivable state. Thus, an initiation of the transfer of the image data to the printer is considerably delayed such that productivity of the whole system may be decreased. Original data other than the corresponding original data is made to wait until the processing of the corresponding original data, which includes the conversion, ends. As a result, an operational efficiency is inferior.

There is a possibility of the order of the output becoming disorganized in cases when printing plates corresponding to each of four colors, cyan (C), magenta (M), yellow (Y) and black (K) are made for printing in a printer and all of the printing plates corresponding to the colors must be put in order. For example, a case in which, in correspondence with a printing request from the computers, each of the plates which corresponds to two jobs (which jobs include C, M, Y, or K color designation) must be alternately outputted. In such cases, it takes time to superimpose all of the printing plates corresponding to the four colors. As a result, the whole operational efficiency decreases.

SUMMARY OF THE INVENTION

The present invention was developed to solve the above-described problems and an object of the present invention is to provide an image recording device, an image recording system and an image recording method, which can improve a productivity by receiving simultaneously a plurality of image data even if a host computer having a slow rate of image data transfer of image data sent from a plurality of host computers is provided.

According to a first aspect of the present invention, an image recording system comprising a buffer, which stores image information simultaneously and independently when the image information is sent from a plurality of image information supplying devices, is provided.

In accordance with the first aspect, the image recording device is provided with the buffer and the image information sent simultaneously from the image information supplying devices is stored simultaneously and independently in the buffer. Accordingly, the time required for sending the image information can be reduced such that productivity is improved.

The first aspect of the present invention may include an image recording instructing component which gives instructions to record an image based on the image information on a recording medium in the order the storage of the image information to the buffer was completed.

In accordance with the first aspect of the present invention, by giving instructions to image record in the order the storage the image information was completed with an image recording designating component, the time required for the image recording is reduced, and the productivity can be improved for various amounts of the image information.

According to a second aspect of the present invention, there is provided an image recording system whose network is configured by a plurality of image information supplying devices and a plurality of devices including an image recording device which records an image based on the image information supplied from the image information supplying devices. The image recording device includes a receiving component which receives simultaneously the image information sent from the plurality of image information supplying devices on the network and accumulates independently the received image information, a selecting component which selects the image information the reception of which by the receiving component has been completed first and an instructing component which instructs the image recording for the image information selected by the selecting component.

In accordance with the second aspect of the present invention, the image information sent from the plurality of image information supplying devices on the network is received during the same period of time, and the image information is independently stored. The selecting component selects the image information which has been received first, and the instructing component gives instructions to image record the selected image information. Thus, the time required for the image recording can be reduced such that the productivity can be improved.

The second aspect of the present invention may include an image recording initiate instructing component which instructs starting to record an image, based on the image information, on a recording medium when a ratio of an amount of the image information accumulated in the receiving component to a total amount of the image information exceeds a predetermined threshold.

In accordance with the second aspect of the present invention, even if all image information has not been stored in the receiving component, when the ratio of the amount of the image information stored in the receiving component to the total amount of the image information exceeds a predetermined threshold, instructions to initiate recording of an image based on the image information on a recording medium are given. Accordingly, the time required for the image recording can be reduced such that the productivity can be improved.

The second aspect of the present invention may include an image recording initiate instructing component which instructs starting to record an image, based on the image information, on a recording medium when a ratio of an amount of the image information which has not been accumulated in the receiving component to the total amount of the image information is no more than a predetermined threshold.

In accordance with the second aspect of the present invention, even if all image information has not been stored in the receiving component, when the ratio of the amount of the image information which has not been accumulated in the receiving component (i.e., the image information to be accumulated in the receiving component to the total amount of the image information is equal to or less than a predetermined threshold) instructions to initiate recording of an image based on the image information on a recording medium are given so that the time required for the image recording can be reduced. As a result, the productivity can be improved.

In accordance with the second aspect of the present invention, the image recording device includes a related information adding component which adds additional information indicating that there is related image information to the related image information when the received image information relates to each other, a related imaging designating component which instructs consecutively performing the image recording processing for the related additional information added by the related information adding component. One of the image recording device and the image information supplying device has a designating/selecting component which selects one of the designating component and the related imaging designating component.

In accordance with the second aspect, the designating/selecting component selects one of the instructing component and the related image designating component. If the designating/selecting component selects the instructing component, the image recording is performed in the order the storage of the image information was completed. If the designating/selecting component selects the related image designating component, when there is related image information in the received image information, additional information indicating that there is related image information is added to the related image information by a related information adding component. Then, the related image processing instructing component gives instructions to perform the image recording consecutively for the image information added by the related information adding component. Thus, either the image recording performed in the order the storage of the image information was completed, or the related image recording can be chosen. Thus the image recording can be selected in accordance with a user's objective. The time required for the image recording can be reduced and the productivity can be improved.

In accordance with the second aspect of the present invention, the receiving component may receive the image information by time sharing.

In accordance with the second aspect, the image information can be received apparently simultaneously by time sharing. Thus, when the image information from the image information supplying devices is supplied, the time therefore can be reduced. Further, the productivity can be improved.

In accordance with the second aspect of the present invention, the image information supplying device may include a generating component which generates image information that is appropriate for the image recording performed by the image recording device from original image information.

In accordance with the second aspect, while the image information supplying device generates the image information appropriate for the image recording performed by the image recording device from original image information, the image recording device can receive the image information sent from another image information supplying device. Consequently, it is unnecessary for the image recording device to generate the image information appropriate for the image information, and thus, the productivity can be improved.

According to a third aspect of the present invention, there is provided an image recording method which utilizes an image recording system having a network that comprises a plurality of image information supplying devices and a plurality of devices including an image recording device which records an image based on image information supplied from the image information supplying devices. The image recording method includes the steps of receiving simultaneously the image information sent from the image information supplying devices during the same period of time, storing independently the image information, selecting the image information the reception of which was completed first from among the received image information, giving instructions to image record the selected image information, and performing the instructed image recording.

In accordance with the third aspect of the present invention, the image recording system comprises a receiving component which receives simultaneously the image information sent from the image information supplying devices and stores independently the received image information, a selecting component which selects the image information the reception which was completed first from among the received image information, and the instructing component which gives instruction to image record the image information selected by the selecting component. By so doing, the time required for the image recording can be reduced such that the productivity can be improved.

In the third aspect of the present invention, when the ratio of the amount of the stored image information to the total amount of the image information exceeds a predetermined threshold, instructions to initiate recording of an image, based on the image information, on a recording medium may be given.

According to the third aspect, the image recording device is provided with the image recording initiate instructing component which gives instructions to initiate recording of an image, based on the image information, on a recording medium when the ratio of the amount of the stored image information to the total amount of the image information exceeds a predetermined threshold. Thus, the time required for the image recording can be reduced and the productivity can be improved.

In the third aspect of the present invention, when a ratio of an amount of the image information which has not been stored (i.e., the image information to be accumulated) to the total amount of the image information is equal to or less than a predetermined threshold, recording of an image based on the image information on a recording medium may be initiated.

According to the third aspect, the image recording device is provided with the image recording initiate instructing component which gives instructions to initiate recording of an image based on the image information on a recording medium when the ratio of the amount of the image information which has not been stored (i.e., the image information to be stored) to the total amount of data of the image information is equal to or less than a predetermined threshold. Thus, the time required for the image recording can be reduced and the productivity can be improved.

According to a fourth aspect of the present invention, there is provided an image recording method which uses an image recording system whose network comprises a plurality of image information supplying devices and a plurality of devices including an image recording device which records an image based on the image information supplied by the image information supplying devices. The image recording method includes the steps of receiving simultaneously the image information sent from the image information supplying devices during the same period of time, storing the image information independently, adding additional information indicating that there is related image information to the related image information when the received image information relates to each other, giving instructions to perform the image recording consecutively corresponding to the related additional image information, and performing the designated image recording.

In accordance with the fourth aspect, the image recording system comprises a receiving component which receives simultaneously the image information sent from the image information supplying devices and stores independently the received image information, a related information adding component which adds additional information indicating that there is related image information to the related image information when the received image information relates to each other, and a related image processing instructing component which gives instructions to perform image recording corresponding to the additional image information added by the related information adding component. The time required for the image recording can be reduced such that the productivity can be improved.

In the fourth aspect of the present invention, it is possible to select whether or not the image recording processing for the related additional information is preferentially performed.

According to the fourth aspect, the selecting component for selecting whether or not the image recording for the related additional information is preferentially performed is provided at the image information supplying device or the image recording device. If the selecting component selects that the image recording for the related additional information is to be preferentially performed, the image recording for the related additional information is carried out. Alternatively, if the selecting component does not select that the image recording for the related additional information is to be preferentially performed, the image information for which reception was completed first is selected from the received image information. Then, the image recording for the selected image information is instructed and the instructed image recording is carried out. In this way, an image recording method which corresponds to a user's objective can be selected and the productivity can be improved.

DESCRIPTION OF THE PREFERRED EMBODIMENTS

First Embodiment

A structure of a first embodiment of the present invention will be described in detail with reference to the drawings.

Figure 1:
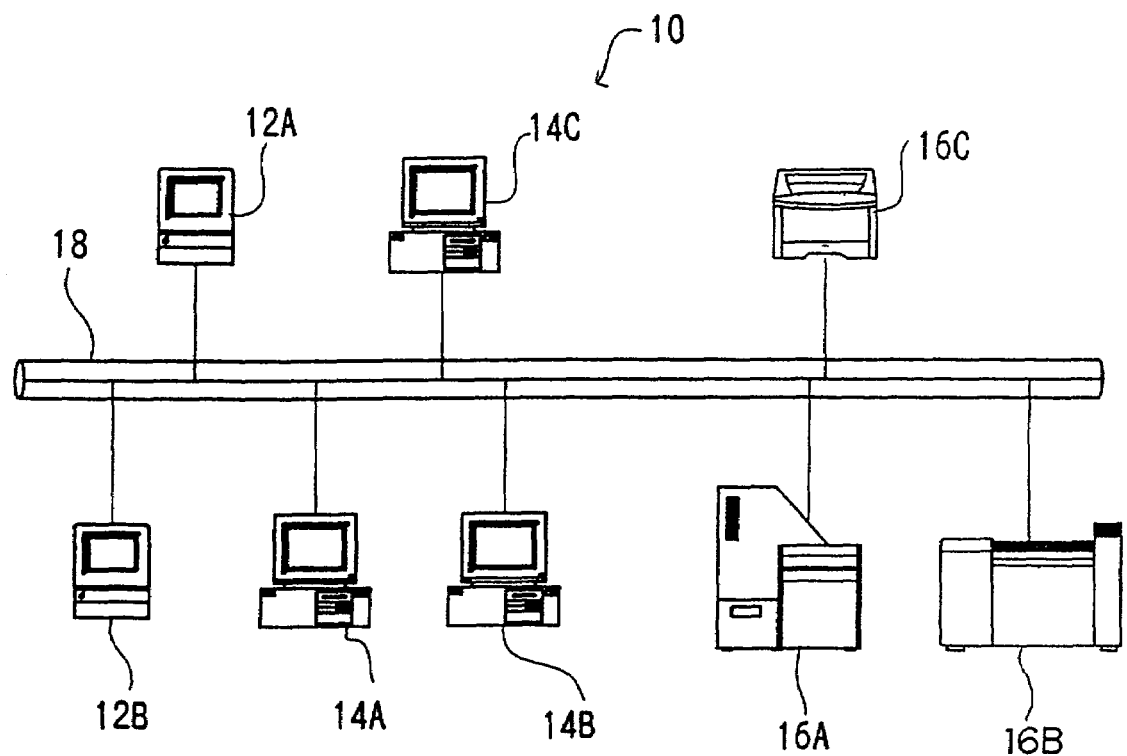
FIG. 1 is a schematic structural view of an image recording system relating to the present invention.

As shown in FIG. 1, an image recording system 10 relating to the present embodiment includes a first host computer 12A and a second host computer 12B which are image information supplying devices for designating in order, to output, image data produced by a user, a first printer 16A, a second printer 16B and a third printer 16C which are image recording devices for printing and outputting the image data on a predetermined paper, and a first printer server 14A, a second printer server 14B and a third printer server 14C which are always monitoring operational conditions of the three printers. The whole system forms a bus network by connecting each of these devices via a bus 18 so as to supply and receive various data.

The first host computer 12A and the second host computer 12B are devices for outputting, by a user's operation, job information (a printing job), and the equivalent which include: information that indicates a printer that will be an outputting destination; various setting information relating to image recording operations (for example, a number of sheets to be outputted, a size of paper to be used and the equivalent), which are the image recording conditions; and image data, which will become an outputted object.

The first printer 16A, the second printer 16B and the third printer 16C are color printers which can print both black-and-white images and color images. When a color image is to be outputted, a process for preparing a color print is performed as a printing process. In the process for preparing a color print, a print for each of the colors cyan (C), magenta (M), yellow (Y) and black (K) is successively formed to correspond to the image data to be outputted. Finally, precise registration is decided for the respective prints and then the prints are printed in a superimposed manner such that the image data to be outputted is reproduced.

In the first host computer 12A, the second host computer 12B and the third host computer 12C, output image data outputted from each of the first host computer 12A, the second host computer 12B and the third host computer 12C can be converted into data with a format corresponding to a printer and the resulting data can be transferred to the printer. For example, a so-called rasterizing processing for converting vector image data, which is the output image data, into bit map image data corresponding to a resolution of each of the printers can be carried out. Each of the host computers has information (device information) which exhibits a performance which is inherent to each device and relates to a calibration of the printers connected on the network, and carries out the rasterizing processing based on the device information of the printer which was designated as the outputting destination.

The above-described printers have an ordinary mode and a related image priority mode. In the ordinary mode, the image recording conditions are interpreted and even if there is image data which relates to each other among a plurality of received image data, the relations among the data is ignored and the image recording received is performed in the order the image data is received. In the related image priority mode, if there is related image data among the plurality of image data received, the image recording for the related image data is given preference.

Figure 2:
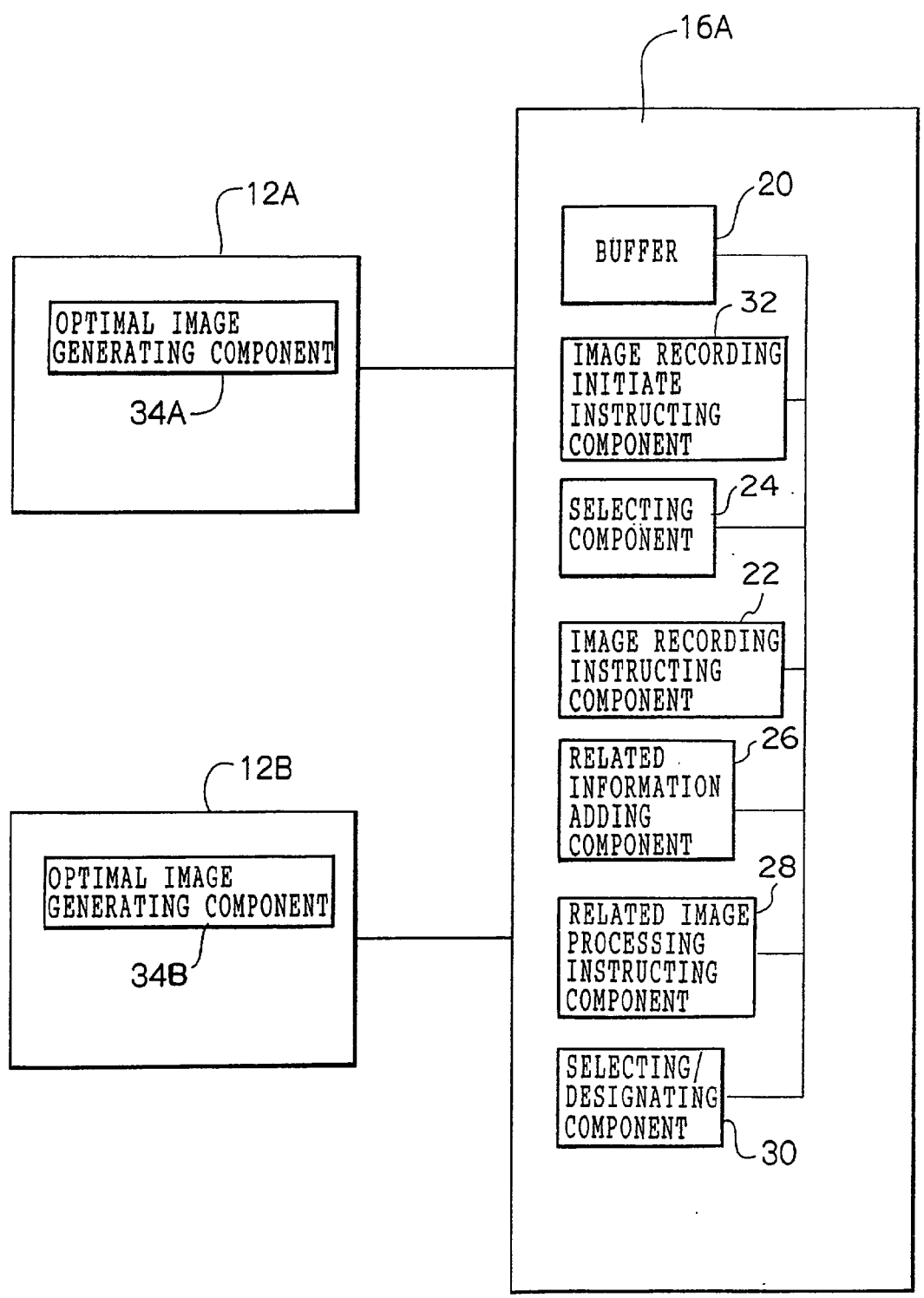
FIG. 2 is a schematic structural view of an image recording system of a first embodiment of the present invention.

FIG. 2 shows the first host computer 12A, the second host computer 12B and the first printer 16A in the first embodiment of the present invention.

The first printer 16A is provided with a buffer 20 serving as a receiving component which accumulates image information simultaneously and independently when receiving image information, including the image recording conditions and the image data, during the same period of time.

Also the first printer 16A is provided with an image recording instructing component 22 for giving instructions to record, based on the image information and in the order that the accumulation of the image information in the buffer 20 was completed, images on a recording medium.

Further, the first printer 16A is provided with a select component 24 which selects from among the image information received by the buffer 20 the image information that was received first.

Namely, the image recording instructing component 22 gives instructions to record an image corresponding to the image information selected by the select component 24.

The first printer 16A receives the plurality of image information by time sharing, and the image information is accumulated in the buffer 20.

The first printer 16A is provided with a related information adding component 26 which, when the received image information relates to each other, adds additional information, which indicates that there is image information related to each other, to the related image information.

Moreover, the first printer 16A includes a related image processing instructing component 28 which gives instructions so as to consecutively record each of the images which correspond to the additional information which was added by the related information adding component 26.

The first printer 16A also includes a designating/selecting component 30 which selects one of the image recording instructing component 22 and the related image processing instructing component 28.

Thus, it is possible to select an imaging mode from among the ordinary mode and the related image priority mode in accordance with a user's purpose.

The first printer 16A is provided with an image recording initiate instructing component 32. The image recording initiate instructing component 32 is an instructing component for giving instructions to initiate the recording of an image, based on the image information, on a recording medium when a ratio of an amount of the image information accumulated in the buffer 20 to a total amount of the image information exceeds a predetermined threshold. Alternatively, the image recording initiate instructing component 32 gives instructions to initiate the recording of an image, based on the image information, on a recording medium when a ratio of an amount of the image information which has not yet been accumulated in the buffer 20 (i.e., the image information to be accumulated in the buffer 20) to the total amount of data of the image information is equal to or less than a predetermined threshold.

Accordingly, the time from when the image recording starts when the image recording ends can be reduced as compared to a case in which the image recording is performed after all image information have accumulated in the buffer 20.

The first host computer 12A and the second host computer 12B are provided with optimal image generating components 34A and 34B, respectively, serving as a generating component.

The optimal image generating components 34A and 34B generate image information appropriate for image recording by the first printer 16A by converting original image information.

Thus, in the printer 16A, the received image information can be treated as data for use at the time of image recording without further processing. By omitting a process for generating image information appropriate for the image recording in the printer 16A, the time from when the image recording starts to the time when the image recording ends can be reduced.

Next, an operation of the first embodiment of the present invention will be described in detail with reference to the drawings.

First, a description will be given of a case in which the ordinary mode is selected.

Figure 3:
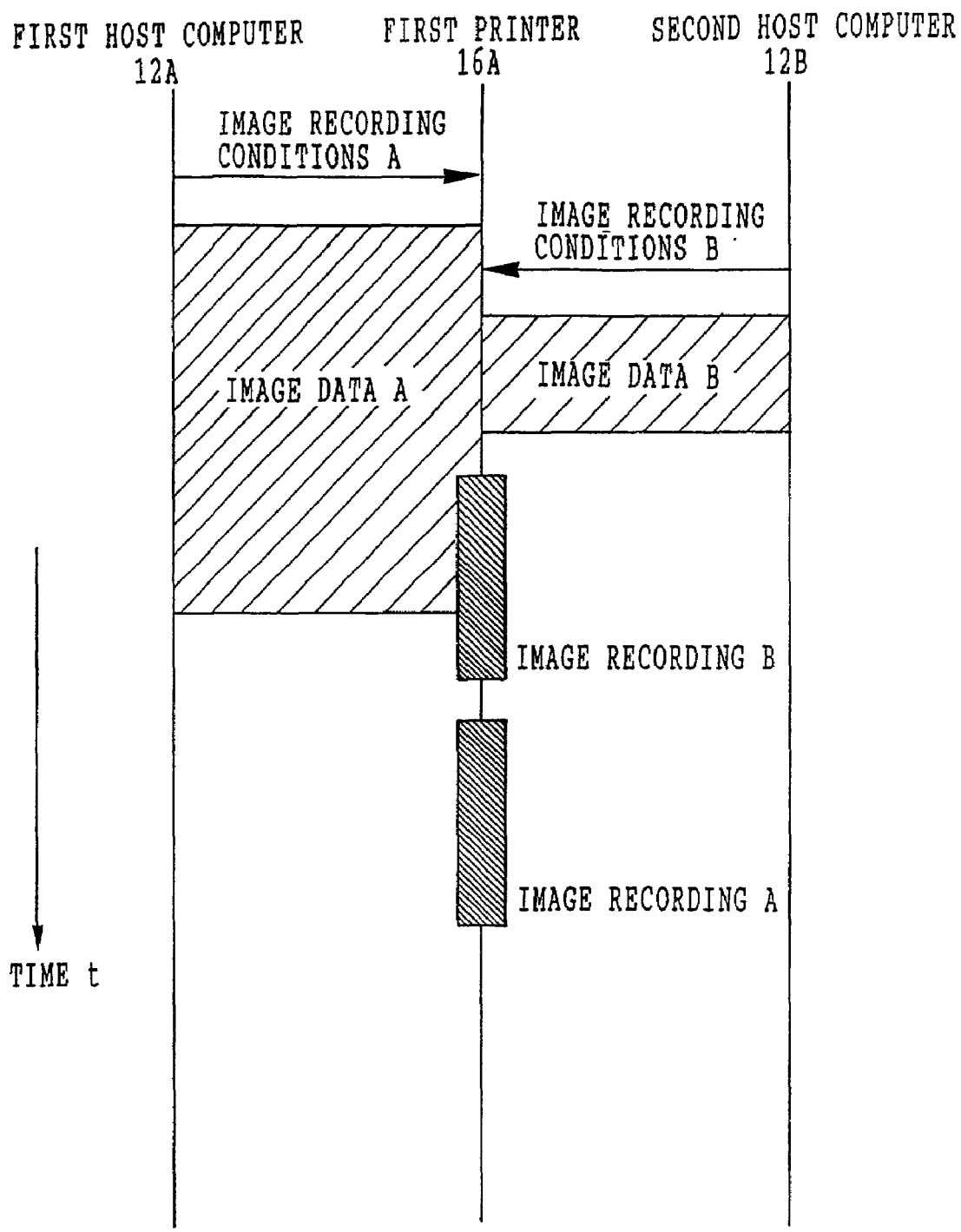
FIG. 3 is a view showing a processing sequence in an ordinary mode of an image recording relating to the present invention.

FIG. 3 shows a processing sequence when the ordinary mode is selected.

In this processing sequence, image data corresponding to image recording conditions A is referred to as image data A and image data corresponding to image recording conditions B is referred to as image data B.

The image recording conditions A are sent from the first host computer 12A to the first printer 16A.

The first printer 16A receives the image recording conditions A.

The image data A is sent from the first host computer 12A to the first printer 16A successively after the transmission of the image recording conditions A is completed.

The first printer 16A begins to receive the image data A.

While the image data A is being sent from the first host computer 12A to the first printer 16A, the image recording conditions B are sent from the second host computer 12B to the first printer 16A.

Even if the first printer 16A is in the process of receiving the image data A, the first printer 16A receives the image recording conditions B.

The image data B is sent from the second host computer 12B to the first printer 16A successively after the transmission of the image recording conditions B is completed.

Even if the first printer 16A is in the process of receiving the image data A, the first printer 16A starts to receive the image data B.

The first printer 16A completes the reception of the image data B sent from the second host computer 12B prior to completing the reception of the image data A sent from the first host computer 12A.

When a ratio of an amount of the image information accumulated in the buffer 20 to a total amount of the image information exceeds a predetermined threshold, instructions to initiate recording, based on the image information, of an image corresponding to the image data B on a recording medium are given. Alternatively, when a ratio of the amount of the image information which has not yet been accumulated in the buffer 20 (i.e., the image information to be accumulated in the buffer 20) to the total amount of the image information is equal to or less than a predetermined threshold, the recording, based on the image information, of an image corresponding to the image data B on a recording medium is initiated.

Namely, the image recording B for the image data B, the reception thereof being completed before that of the image data A, is performed preferentially.

During the image recording B, reception of the image data A is completed.

When the image recording B ends, the image recording A for the image data A is successively performed.

When the image recording A ends, all of image recordings in the first printer 16A are finished.

Next, a case in which the related image priority mode is selected will be described.

Figure 4:
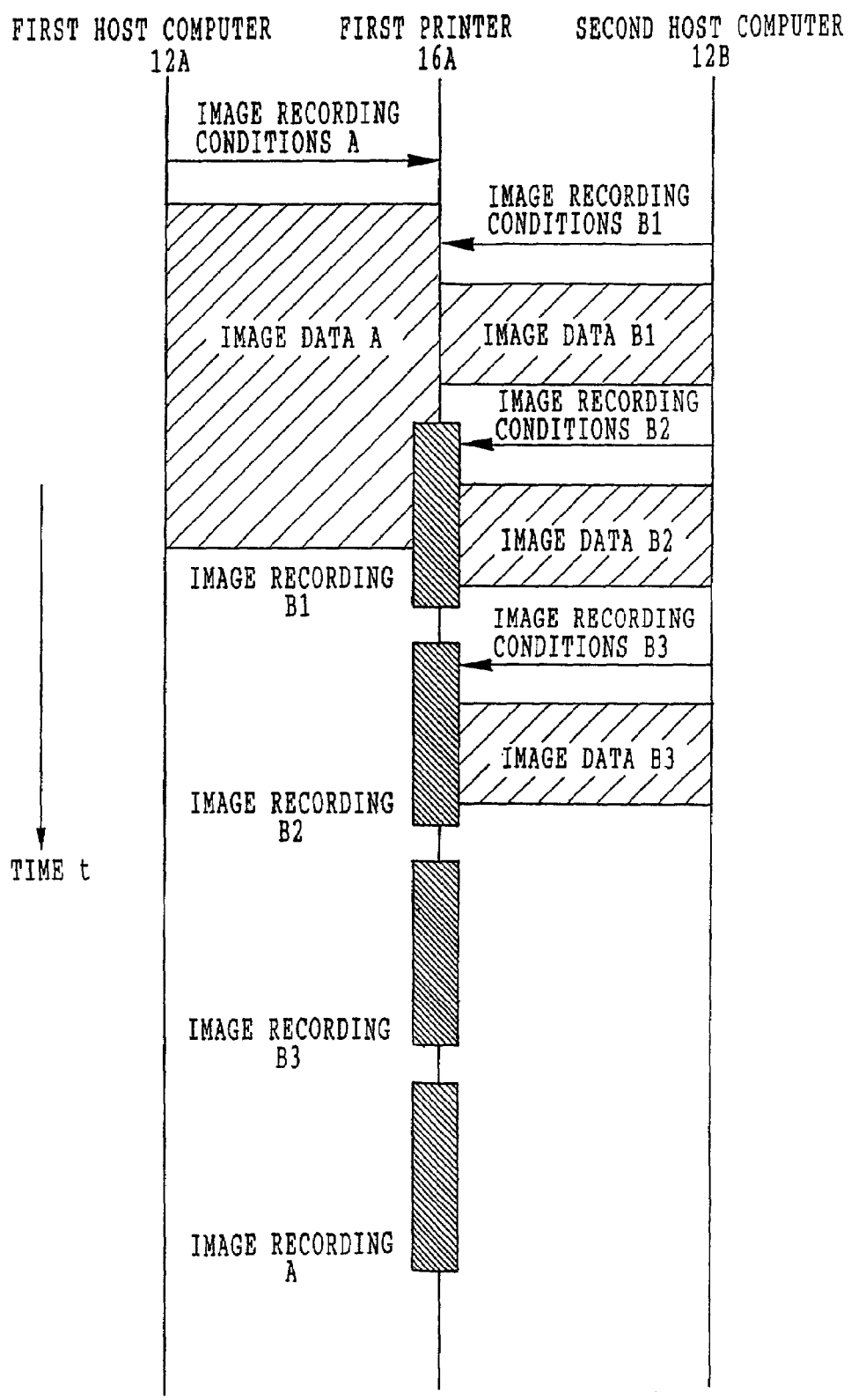
FIG. 4 is a view showing a processing sequence in a related image recording priority mode of the image recording relating to the first embodiment of the present invention.

FIG. 4 shows a processing sequence when the related image priority mode is selected.

In this processing sequence, image data corresponding to the image recording conditions A, B1, B2 and B3 are referred to as image data A, B1, B2 and B3, respectively. The image recording conditions B1, B2 and B3 are image recording conditions for image information that is related to each other, thus the image data B1, B2 and B3 are treated as image data for the related image information.

The image recording conditions A are sent from the first host computer 12A to the first printer 16A.

The first printer 16A receives the image recording conditions A.

The image data A is sent from the first host computer 12A to the first printer 16A successively after the transmission of the image recording conditions A is completed.

The first printer 16A begins to receive the image data A.

While the image data A is in the process of being sent from the first host computer 12A to the first printer 16A, the image recording conditions B1 are sent from the second host computer 12B to the first printer 16A.

Even if the first printer 16A is receiving the image data A, the first printer 16A receives the image recording conditions B1.

Transmission of the image recording conditions B1 is completed.

It is determined by the image recording conditions B1 that the image data B1 sent from the second host computer 12B is the related image data.

The image data B1 is sent from the second host computer 12B to the first printer 16A successively after the transmission of the image recording conditions B1 is completed.

Even if the first printer 16A is in the process of receiving the image data A, the first printer 16A receives the image data B1

When a ratio of an amount of the image information accumulated in the buffer 20 to the total amount of the image information exceeds a predetermined threshold, instructions to initiate recording, based on the image information, of an image corresponding to the image data B1 on a recording medium are given. Alternatively, a ratio of the amount of the image information which has not yet been accumulated in the buffer 20 (i.e., the image information to be accumulated in the buffer 20) to the total amount of image information is equal to or less than a predetermined threshold, based on the image information, the recording of an image corresponding to the image data B1 on a recording medium is initiated.

The image recording B1 for the image data B1 is preferentially performed.

The image recording conditions B2 are sent from the second host computer 12B to the first printer 16A.

Even if the first printer 16A is in the process of receiving the image data A, the first printer 16A receives the image recording conditions B2.

The image data B2 is sent from the second host computer 12B to the first printer 16A successively after the transmission of the image recording conditions B2 is completed.

Even if the first printer 16A is in the process of receiving the image data A, the first printer 16A starts to receive the image data B2.

While the first printer 16A is in the process of receiving the image data B2, the reception of the image data A is completed.

The first printer 16A completes the reception of the image data B2.

When the first printer 16A receives the image recording conditions B2, because the image recording B2 for the image data B2 relates to the image recording B1, the image recording B2 corresponding for the image data B2 is preferentially performed without performing the image recording A for the received image data A.

The image data A that was sent from the first host computer 12A to the first printer 16A continues to be stored in the buffer 20 until all image recordings B1, B2 and B3, corresponding to the related image data sent from the second host computer 12B, are completed.

During the image recording B2, the data for the image recording conditions B3 is sent from the second host computer 12B to the first printer 16A.

The first printer 16A receives the image recording conditions B3.

When the transmission of the image recording conditions B3 is completed, the image data B3 is sent to the first printer 16A.

The first printer 16A starts to receive the image data B3.

The image data B3 is sent from the second host computer 12B to the first printer 16A successively after the first printer A has completed reception of the image recording conditions B3.

When the image recording B3 ends, the image recording A is performed.

Namely, the image recording A for the image data A that was stored in the buffer 20 is performed after all of the image recordings for the image data of the related image information are carried out.

When the image recording A ends, all image recordings in the first printer 16A are completed.

Second Embodiment

Hereinafter, a structure of a second embodiment of the present invention will be described in detail with reference to the drawings.

Portions of the second embodiment which are same as those of the first embodiment of the present invention are denoted by the same reference numbers, and descriptions thereof will be omitted.

An image recording system 10 in the second embodiment of the present invention is the same as the image recording system of the first embodiment shown in FIG. 1.

Figure 5:
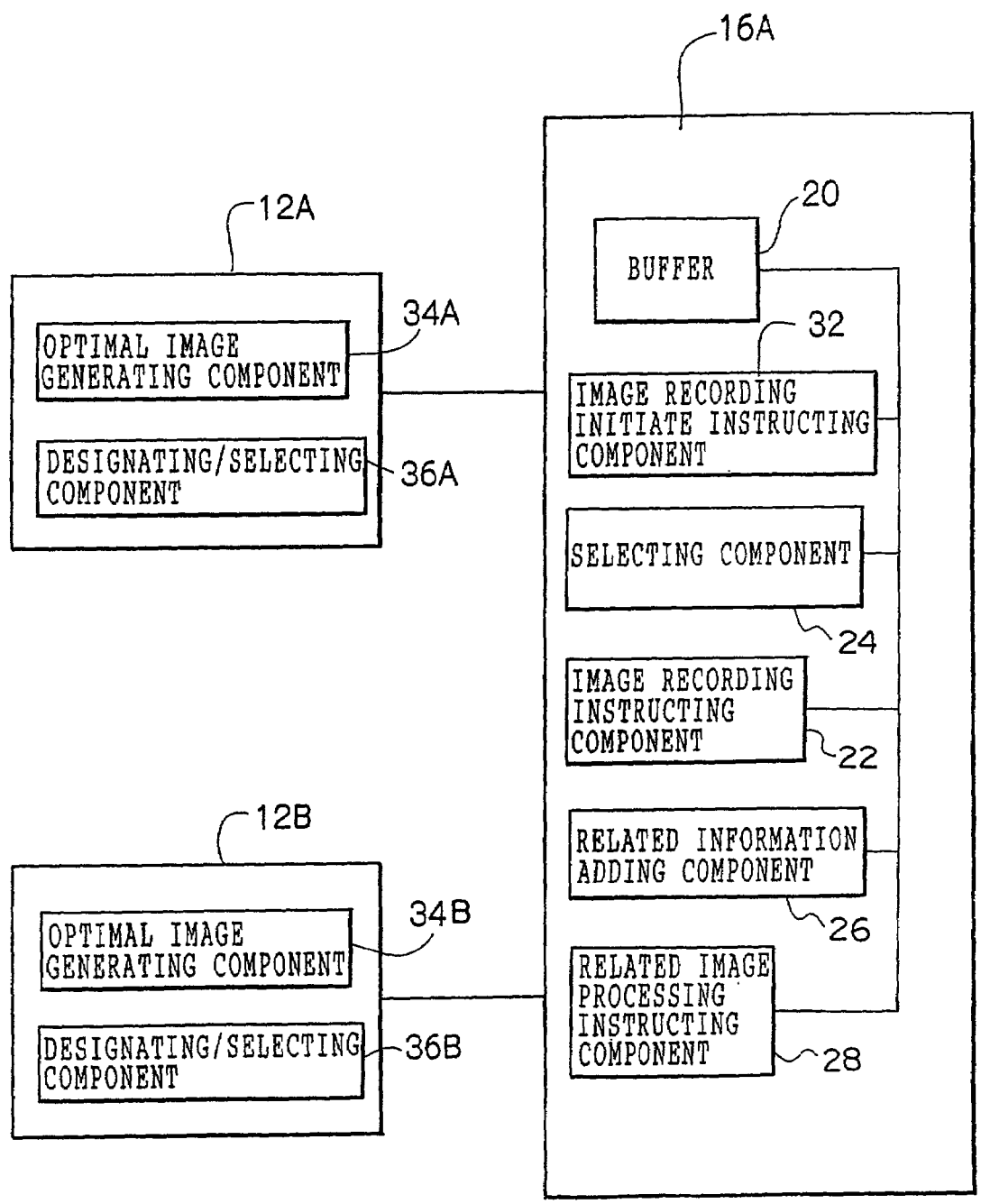
FIG. 5 is a schematic structural view of an image recording system relating to a second embodiment of the present invention.

FIG. 5 shows the first host computer 12A, the second host computer 12B and the first printer 16A of the second embodiment.

The first host computer 12A and the second host computer 12B are respectively provided with designating/selecting components 36A and 36B for selecting one of the image recording instructing component 22 and the related image processing instructing component 28.

When the designating/selecting components 36A and 36B select the related image processing instructing component 28, the components 36A and 36B output to the first printer 16A a related image priority mode initiate signal to initiate the related image recording or a related image priority mode complete signal to complete the related image recording.

When the first printer 16A receives the related image priority mode initiate signal, the related image priority mode image recording starts. When the first printer 16A receives the related image priority mode complete signal, the related image priority mode image recording is completed.

In this way, the image processing mode can be selected, in accordance with a user's purpose, from the ordinary mode and the related image priority mode by instructions from the host computer.

Next, an operation of the second embodiment of the present invention will be described in detail with reference to the drawings.

When the ordinary mode is selected, the operation of the second embodiment is the same as that of the first embodiment. Therefore, a description thereof will be omitted. Only a case of the related image priority mode being selected will be described.

Figure 6:
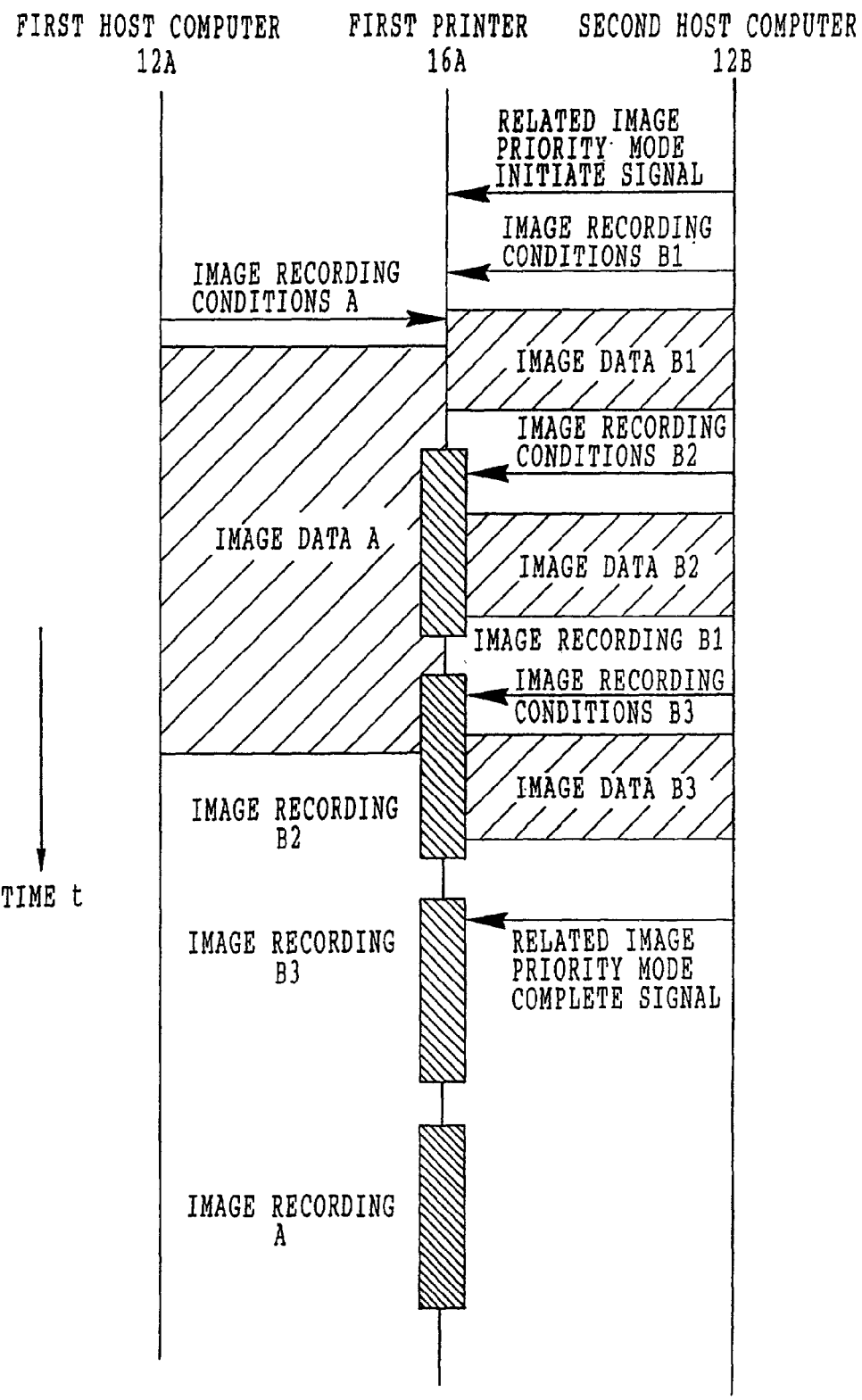
FIG. 6 is a view showing a processing sequence in the related image recording priority mode of the image recording relating to the second embodiment of the present invention.

FIG. 6 shows a processing sequence in the case of the related image priority mode being selected.

The second host computer 12B sends the related image priority mode initiate signal to the first printer 16A.

When the first printer 16A receives the related image priority mode initiate signal, the image recording for the image information received from the second host computer 12B is performed in the related image priority mode.

The image recording conditions B1 are sent from the second host computer 12B to the first printer 16A.

The first printer 16A receives the image recording conditions B1.

The image data B1 is sent from the second host computer 12B to the first printer 16A successively after the transmission of the image recording conditions B1 is completed.

The first printer 16A starts to receive the image data B1.

While the image data B1 is being sent from the second host computer 12B to the first printer 16A, the image recording conditions A are sent from the first host computer 12A to the first printer 16A.

Even if the first printer 16A is in the process of receiving the image data B1, the first printer 16A receives the image recording conditions A.

The transmission of the image recording conditions A is completed.

The image data A is sent from the first host computer 12A to the first printer 16A successively after the transmission of the image recording conditions A is completed.

If a ratio of an amount of the image information stored in the buffer 20 to the total amount of the image information exceeds a predetermined threshold, instructions to initiate recording, based on the image information, of an image, which corresponds to the image data B1, on a recording medium is designated. Alternatively, if a ratio of an amount of the image information which has not been stored in the buffer 20 (i.e., the image information to be stored in the buffer 20) to the total amount of the image information is equal to or less than the predetermined threshold, recording, based on the image information, of an image, which corresponds to the image data B1, on a recording medium is initiated.

The image recording B1 for the image data B1 begins.

The image recording conditions B2 are sent from the second host computer 12B to the first printer 16A.

Even if the first printer 16A is in the process of receiving the image data A, the first printer 16A also receives the image recording conditions B2.

The image data B2 is sent from the second host computer 12B to the first printer 16A successively after the transmission of the image recording conditions B2 is completed.

Even if the first printer 16A is in the process of receiving the image data A, the first printer 16A starts to receive the image data B2.

The first printer 16A completes the reception of the image data B2.

Because the image recording B2 for the image data B2 relates to the image recording B1, when the first printer 16A receives the image recording conditions B2, the image recording B2 is performed after the image recording B1.

During the image recording B2, the image recording conditions B3 are sent from the second host computer 12B to the first printer 16A.

The first printer 16A receives the image recording conditions B3.

When the transmission of the image recording conditions B3 is completed, the image data B3 is sent to the first printer 16A.

The first printer 16A starts to receive the image data B3.

While the first printer 16A is in the process of receiving the image data B3, the reception of the image data A is completed.

The image data B3 is sent from the second host computer 12B to the first printer 16A successively after the reception of the image recording conditions B3 by the first printer 16A and the reception of the image data A are completed.

The image data A sent from the first host computer 12A to the first printer 16A is kept stored in the buffer 20 until the first printer 16A receives the related image priority mode complete signal from the second host computer 12B.

When the first printer 16A receives the related image priority mode complete signal from the second host computer 12B, the related image priority mode ends after completing the image recording B3. Then, the image recording A for the image data A stored in the buffer 20 is carried out.

Namely, the image recording A for the image data A stored in the buffer 20 is performed subsequent to the completion of all image recording that correspond to the image data for the related image information.

When the image recording A is completed, all image recordings in the first printer 16A are completed.

According to the invention of the present embodiments, the time from when the image recording starts to when the image recording ends can be reduced as compared to a case in which all image information is accumulated in the buffer 20 prior to the image recording.

By indicating the completion of the image recording corresponding to the related image information instead of indicating the relatedness of the image information which the image recording conditions, the image recording can continue, and continuity of printing can be ensured. Even in this case, the same effects as those of the present embodiments can be obtained.

Further, when the related image information is sent by the host computers, the image recordings for the first image information and for the remaining related image information, which is related to the first image information, are performed preferentially when the reception of the first image information is completed. As a result, a productivity of the image recording can be improved.

The host computers and the components of the printers shown in FIGS. 2 and 5 may be configured by a hardware or by a software.

As described above, in the image recording device, the image recording system and the image recording method relating to the present invention, the received image information can be stored independently.

Even if all of the image information has not been stored in a receiving component, when a ratio of the amount of the image information stored in the receiving component to the total amount of the image information exceeds a predetermined threshold, or when a ratio of the amount of the image information which has not been accumulated in the receiving component to the total amount of the image information is equal to or less than a predetermined threshold, instructions to initiate image recording on a image medium, based on the image information, are given. This way, the time required for image recording can be reduced such that the productivity can be improved.

Further, even if all of the image information has not been stored in the receiving component, when the ratio of the amount of the image information which has not been stored in the receiving component (i.e., the image information to be stored in the receiving component) to the total amount of the image information is equal to or less than a predetermined threshold, instructions to initiate recording, based on the image information, of an image on a recording medium are given. In this way, the time required for image recording can be reduced such that the productivity can be improved.

The image recording is performed by selecting, depending on the user's purpose, either the image recording for recording an image in the order that the storage of the image information was completed, or the related image recording in which image recording for the related image information is performed. In this way, the time required for image recording can be improved.

What is claimed is:

1. An image printing device connected a plurality of image supplying devices by a network, the image printing device comprising:
    a receiving component which stores the image simultaneously and independently when receiving a plurality of the image information simultaneously from the image supplying devices;
    an image printing component which prints an image onto a medium based on image information; and
    an image printing instructing component which instructs the image printing component to print an image, based on the image information, in the order that the receiving component completed the storage of the plurality of image information when the image information has been received simultaneously from the image supplying devices.

2. The image printing device of claim 1 further comprising:
    an image printing initiate instructing component which instructs the image printing component to print an image, based on the corresponding image information, when a ratio of an amount of the corresponding image information stored in the receiving component to a total amount of stored image information exceeds a predetermined threshold.

3. The image printing device of claim 1 further comprising:
    an image printing initiate instructing component which instructs the image printing component to print an image, based on the corresponding image information, when a ratio of an amount of the corresponding image information to be received by the receiving component to the total amount of the corresponding image information is no more than a predetermined threshold.

4. The image printing device of claim 1 further comprising:
    a related information adding component which adds additional information to related image information when the plurality of received image information relates to each other;
    a related imaging designating component which instructs the image printing component to print an image by using consecutively the related image information to which the additional information has been added; and
    a designating/selecting component which selects one of the image printing instructing component and the related image processing instructing component.

5. The image printing device of claim 1 further comprising:
    a related information adding component which adds additional information to related image information when the plurality of received image information relates to each other; and
    a related image processing instructing component which instructs the image printing component to print an image by using consecutively the related image information to which the additional information has been added; and
    the image information supplying device, which comprises a designating/selecting component which selects one of the image printing instructing component and the related image processing instructing component.

6. The image recording device of claim 1, wherein the receiving component receives the plurality of image information by time sharing.

7. The image printing system of claim 1, wherein the receiving component stores the plurality of image information independently based upon an initial reception of the image information.

8. An image printing system comprising:
    a plurality of image supplying devices; and
    an image printing device connected to the plurality of image supplying devices via a network, the image printing device including:
    an image printing component which prints an image based on image information;
    a receiving component which stores the image information simultaneously and independently when receiving simultaneously the image information from the plurality of image supplying devices;
    a selecting component which selects the image information which has been stored by the receiving component; and
    a designating component which designates the image printing component to print an image based on the image information selected by the selecting component.

9. The image printing system of claim 8 further comprising:
    an image printing initiate instructing component which instructs the image printing component to print an image, based on the corresponding image information, when a ratio of an amount of the corresponding image information stored in the receiving component to a total amount of the corresponding image information exceeds a predetermined threshold.

10. The image printing system of claim 8 further comprising:
    an image printing initiate instructing component which instructs the image printing component to print an image, based on the corresponding image information, when a ratio of an amount of the corresponding image information to be received by the receiving component to the total amount of the corresponding image information is no more than a predetermined threshold.

11. The image printing system of claim 8, the image printing device further comprising:
- a related information adding component which adds additional information to related image information when the received image information relates to each other;
- a related imaging designating component which instructs the image printing component to print an image by using consecutively the related image information to which the additional information has been added; and
- a designating/selecting component which selects one of the designating component and the related imaging designating component.

12. The image printing system of claim 8, the image printing device further comprising:
- a related information adding component for adding additional information to the related image information when the image information received relates to each other; and
- a related image processing instructing component for instructing the image printing component to print an image by using consecutively the related image information to which the additional information has been added; and
- the image information supplying device which comprises a designating/selecting component which selects one of the designating component and the related image processing instructing component.

13. The image printing system of claim 8, wherein the receiving component receives the plurality of the image information by time sharing.

14. The image printing system of claim 8, the image information supplying device comprising:
- a generating component which converts the image information to be sent into image information appropriate for printing by the image recording component.

15. The image printing system of claim 8, wherein the selecting component selects the image information based on the image information which is completely stored earliest.

16. An image printing method for printing an image with an image system, which image system includes a plurality of image information supplying devices and an image printing device that are connected by a network, the method comprising the steps of:
- storing the image information independently when a plurality of the image information is simultaneously sent from the image information supplying devices to the image printing device;
- selecting the image information for which storage has been completed;
- instructing the printing of an image based on the selected image information; and printing the instructed image.

17. The image printing method of claim 16 further comprising the step of:
- giving instructions to print an image, based on the corresponding image information, when a ratio of an amount of the stored corresponding image information to a total amount of the corresponding image information exceeds a predetermined threshold.

18. The image printing method of claim 16 further comprising the step of:
- giving instructions to print an image, based on the corresponding image information, when a ratio of an amount of the corresponding image information to be sent to the total amount of the corresponding image information is no more than a predetermined threshold.

19. The image printing method of claim 16, wherein the storing step receives the plurality of the image information by time sharing.

* * * * *